United States Patent [19]

Cheesmore, deceased et al.

[11] Patent Number: 4,652,783
[45] Date of Patent: Mar. 24, 1987

[54] ANCHORING WEAR SENSORS IN ELECTRICAL BRUSHING

[75] Inventors: Royston A. Cheesmore, deceased, late of Porth Cawl, by Betty I. Cheesmore, executrix; Rees Morgan, Port Talbot, all of Wales

[73] Assignee: Morganite Electrical Carbon Limited, Glamorgan, Wales

[21] Appl. No.: 440,601

[22] Filed: Nov. 10, 1982

[51] Int. Cl.⁴ ............................................. H02K 13/00
[52] U.S. Cl. ..................................... 310/249; 310/245
[58] Field of Search ............... 310/248, 249, 251, 242, 310/246, 247, 245, 42; 200/61.4 308, 61.41; 340/648

[56] References Cited

U.S. PATENT DOCUMENTS

| | | | |
|---|---|---|---|
| 2,507,780 | 5/1950 | Gilbert | 310/249 |
| 2,631,252 | 3/1953 | Falcettoni | 310/249 |
| 3,153,164 | 10/1964 | Jop | 310/249 |
| 3,666,990 | 5/1972 | Strobl | 310/248 |
| 4,316,186 | 2/1982 | Purdy | 310/249 |

FOREIGN PATENT DOCUMENTS

| | | | |
|---|---|---|---|
| 2804547 | 8/1979 | Fed. Rep. of Germany | 310/249 |
| 795998 | 6/1958 | United Kingdom | 310/249 |
| 1262486 | 5/1969 | United Kingdom | 310/249 |
| 1158298 | 7/1969 | United Kingdom | 310/249 |

Primary Examiner—R. Skudy
Attorney, Agent, or Firm—William R. Hinds

[57] ABSTRACT

Disclosed herein is an electrical brush (1) having a brush wear sensor (9) in the form of a loop (10, 11, 13) of insulated electrical conductor having two arms joined by a looped end, the arms leading from an upper surface of the brush to a depth (d) to be equivalent to the point at which brush wear is to be sensed. A pair of fine bores (5, 6) lead from the brush upper surface to meet a transverse hole (8) in a side face of the brush at the wear depth. Each arm of the sensor loop lies in a respective one of the fine bores with the looped end disposed in the transverse hole and joining the respective arms in the fine bores. Assembly preferably is by insertion of the free ends of the arms of the loop of insulated electrical conductor into the transverse hole and then separately into and through respective ones of the fine bores.

3 Claims, 2 Drawing Figures

ANCHORING WEAR SENSORS IN ELECTRICAL BRUSHING

This invention relates to electrical brushes having a wear sensor in the form of an electrical conductor or lead within the brush body.

Such wear sensor leads have, of course, to be insulated from the electrically conductive brush bodies. United Kingdom Patent Specification No. 1,158,298 in the name of Cello-Pak A/S is an example of a brush body incorporating an embedded loop of an insulated conductor extending down to the limit of permissible wear of the brush. However, in the high temperature conditions experienced by heavy duty or heavy current brushes, difficulty is experienced in anchoring the necessary high temperature insulators which are based on materials such as polymers of fluoroethylene. These high temperature insulators have a smooth, generally inert surface that cannot be simply bonded in the brush body to anchor the sensor.

It is an object of the present invention to overcome the aforesaid difficulty of anchoring sensor leads in a brush body.

According to the present invention an electrical brush assembly has a brush wear sensor in the form of a loop of insulated electrical conductor having two arms joined by a looped end, the arms leading from an upper surface of the brush to a depth equivalent to the point at which brush wear is to be sensed. A pair of fine bores lead from the brush upper surface to meet a transverse hole in a side face of the brush at the wear depth, and each arm of the sensor loop lies in a respective one of the fine bores with the looped end disposed in the transverse hole and joining the respective arms in the fine bores. The transverse hole may be filled with an epoxy resin cement or the like. Assembly preferably is by insertion of the free ends of the arms of the loop of insulated electrical conductor into the transverse hole and thence separately into and through respective ones of the fine bores.

The invention is illustrated by way of example in the Drawings, wherein.

Figure 1:
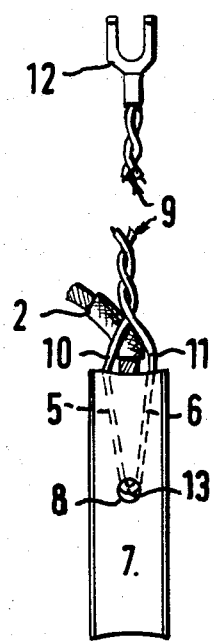
FIG. 1 is a side elevation of a brush in accordance with the invention.
Figure 2:
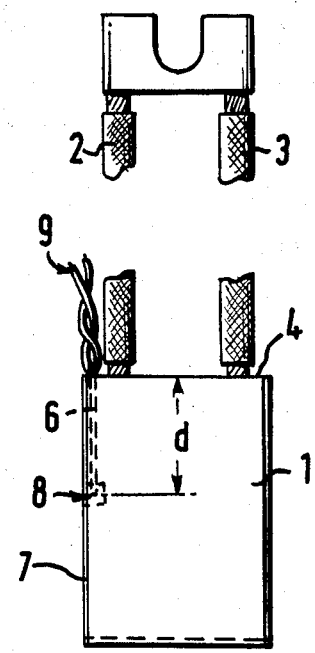
FIG. 2 is a front elevation of the brush of FIG. 1.

As shown, a brush 1 has a pair of silastomer sleeved flexible current shunts 2 and 3 located by tamped copper powder connections in the top 4 of the brush.

Two fine bores 5 and 6 are drilled from the brush top 4, close to the side 7, and angled towards one another to converge at a short hole 8 drilled transversely from the side 7. Hole 8 is drilled at a depth d from the brush top 4 at which it is desired to sense brush wear.

A brush wear sensor 9 in the form of a lead or conductor insulated with TEFLON (Trade Mark) is made into a loop of which the two arms 10 and 11 are each fed into one of the bores 5 and 6 via the side hole 8. The sensor arms are twisted together above the brush and the free ends are connected to a terminal 12. This construction has the advantages of ease of assembly as the lead ends are simple to insert through the side hole 8 into the bores 5 and 6. Also the wear depth d can be set accurately, as it is a combination of the siting of hole 8 and the protrusion into the hole of the loop end 13.

Finally, the hole 8 is filled with ARALDITE (Trade Mark) to bond the loop end 13 in the hole 8, to seal the hole and to help to retain the loop and the ends thereof formed as the brush wears past the hole 8.

The sensor lead 9 is used in known manner to detect wear by current leakage.

I claim:

1. An electrical brush assembly comprising a brush wear sensor in the form of a loop of insulated electrical conductor having two arms joined by a looped end, the arms leading from an upper surface of a brush to a depth equivalent to the point at which brush wear is to be sensed, wherein a pair of fine bores lead from said brush upper surface to meet a transverse hole in a side face of said brush at said wear depth and each of said arms of said sensor loop lies in a respective one of said fine bores with said looped end disposed in said transverse hole and joining the respective arms in said fine bores.

2. An assembly as claimed in claim 1, wherein said looped end is bonded and sealed in said transverse hole.

3. An assembly as claimed in claim 1, wherein said fine bores are located close to said side face of said brush body, said transverse hole is a short hole in said side face and said fine bores are angled towards one another to converge on said short transverse hole.

* * * * *